United States Patent
Groene et al.

(10) Patent No.: US 6,582,341 B2
(45) Date of Patent: Jun. 24, 2003

(54) METHOD FOR MAGNIFYING TORQUE AT DRIVEWAY OF A MOTOR VEHICLE USING A CLUTCH

(75) Inventors: Michael Groene, Bad Ditzenbach (DE); Thomas Kreischer, Waiblingen (DE); Eberhard Leider, Schorndorf (DE); Hartmut Weckenmann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/013,117

(22) Filed: Dec. 7, 2001

(65) Prior Publication Data

US 2002/0108834 A1 Aug. 15, 2002

(30) Foreign Application Priority Data

Dec. 9, 2000 (DE) .......................... 100 61 431

(51) Int. Cl.$^7$ ............................................... B60K 41/02
(52) U.S. Cl. ....................................................... 477/181
(58) Field of Search .................................. 477/73, 181

(56) References Cited

U.S. PATENT DOCUMENTS

| | | | | |
|---|---|---|---|---|
| 4,766,544 A | * | 8/1988 | Kurihara et al. | 477/181 |
| 5,010,863 A | * | 4/1991 | Ishida et al. | 477/181 |
| 5,184,301 A | * | 2/1993 | Stasell | 477/181 |

* cited by examiner

Primary Examiner—Dirk Wright
(74) Attorney, Agent, or Firm—Kenyon & Kenyon

(57) ABSTRACT

In a method for magnifying torque during driveaway of a motor vehicle using a clutch, the driver-selected torque is dynamically magnified in time, and the enhancement component then is reduced down to 0 at increasing vehicle speed as a function of the latter. The driveaway behavior of a vehicle may be perceptibly improved, and an unintended shutoff of the internal combustion engine may be largely prevented when the accelerator pedal is operated too weakly or the clutch is engaged too fast.

9 Claims, 1 Drawing Sheet

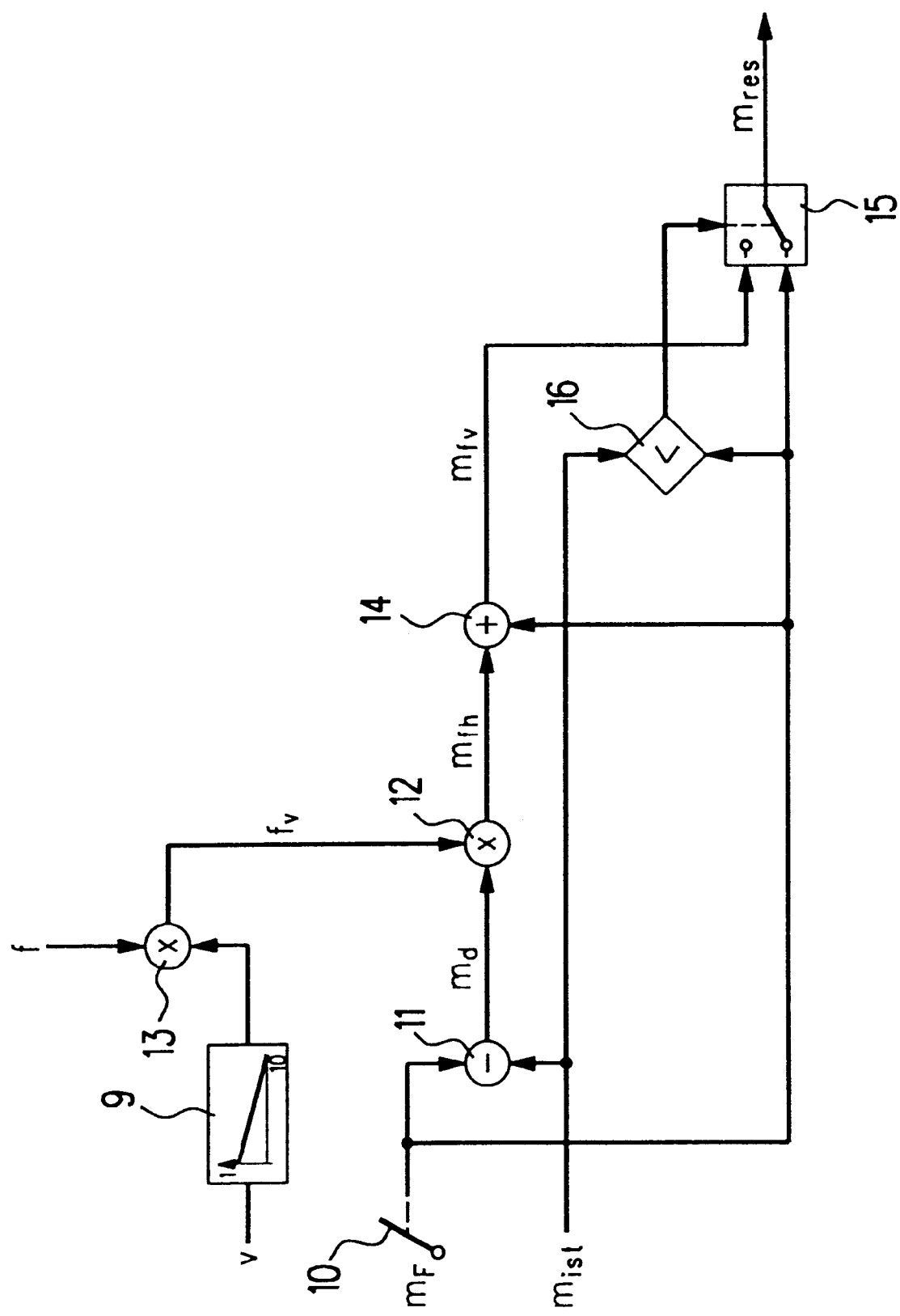

METHOD FOR MAGNIFYING TORQUE AT DRIVEWAY OF A MOTOR VEHICLE USING A CLUTCH

FIELD OF THE INVENTION

The present invention relates to a method for magnifying torque at driveaway of a motor vehicle with the aid of a clutch.

BACKGROUND INFORMATION

During driveaway of a motor vehicle, if the accelerator pedal delivery is too low, and/or engaging or releasing the clutch is performed too rapidly, the engine torque in the lower speed range can fall off so sharply that the engine of the vehicle, developed as an internal combustion engine, can be shut off without intending to do so. Especially in the case of beginner drivers or during driveaway on an uphill street, this danger increases still more.

It is true that fast-reacting idle controllers for keeping up a minimum idling speed of the internal combustion engine are conventional, but even with those, undesired shutoff of the internal combustion engine cannot certainly be prevented, since at fast release of the clutch, the load increase is so strong that, in this very low speed range, the low engine torque falls off correspondingly strongly. Therefore, to solve this problem, as is conventional, one has to press harder on the accelerator pedal, which leads to increased (fuel) use and noise pollution, or the clutch has to be operated more sensitively, which is a matter of skill of the driver in question.

It is an object of the present invention to provide a method by which the driveaway of a motor vehicle from a standing position is made easier, and by which unwanted shutoff (stalling) of the internal combustion engine is prevented.

SUMMARY

The above and other beneficial objects of the present invention are achieved by providing a method as described herein.

According to the present invention, the driver-selected torque is dynamically raised in time, the resulting torque increase preventing the internal combustion engine from coming to an unwanted stop, even if the driver operates the accelerator pedal too little or the clutch moves in too fast. With increasing vehicle speed, the enhancement component is then quickly reduced, so as, for example, not to trigger any accelerator pedal reactions that are too vehement, when parking or leaving a parking space. All in all, the driveaway behavior of the vehicle is perceptibly improved and facilitated.

Reduction of the enhancement component to a value of 0 is already reached at travel speeds of 5 to 10 km/h, because already then no further driveaway problems may appear any more, and this reduction then facilitates getting in and out of a parking space.

Reducing the enhancement component is even reinforced or speeded up by the fact that it is additionally reduced also by the approach of the actual value of the torque to the driver-selected torque correspondingly down to an enhancement component 0. Hereby, on the one hand, a comfortable and safe driveaway is ensured, but then there is a very rapid reduction of the enhancement component, which has a favorable impact especially when entering and leaving a parking space. In this connection, the increased reduction of the enhancement component occurs as a function of the difference between the actual value of the torque and the driver-selected torque.

The enhancement component may be formed with the aid of a speed-dependent multiplication factor, this being lowered by a functional step from the initial value 1, with increasing speed, down to a value of 0, which is reached at a specifiable speed. This multiplier is then linked or multiplied with a definable value to form a multiplication factor. Thus, by this functional step, the speed-dependent reduction of the enhancement component may be functionally set.

In one example embodiment of the method according to the present invention, the difference value between actual value of the torque and driver-selected torque have the multiplication factor applied to them, and the value thus obtained is added to the driver-selected torque for achieving a magnified torque value. It is achieved thereby that the enhancement component is reduced, proportionally to the difference value, even independently of the effect of the functional step, in order thus to contribute to a gentle feedback to the driver-selected torque or the driver setpoint torque.

The enhancement may be limited, even independently of the effect of the functional step, to that time interval during which the actual engine torque is less than the driver-selected torque.

For performing the method, a microcomputer may be provided, which may be, for example, the microcomputer in the central vehicle electronics or the engine electronics, which is present anyway.

An example embodiment of the present invention is illustrated in the drawing and explained in detail below.

BRIEF DESCRIPTION OF THE DRAWING

The FIGURE is a schematic view of a switching system of the example embodiment for the explanation of the method according to the present invention.

DETAILED DESCRIPTION

The driver-selected torque $m_F$, specified by the driver via accelerator pedal 10, which represents the desired torque specified by the driver, together with the actual torque $m_{ist}$, is added to a difference-forming step 11, by which a difference torque $$m_d = m_F - m_{ist}$$

is formed. The difference torque $m_d$ is taken to a multiplier step 12 and is multiplied by a multiplication factor $f_v$, so that, on the output side, a magnified difference torque $m_{fh}$ is formed.

Multiplication factor $f_v$ is formed by multiplication of a definable constant value f in a multiplication step 13 with the output signal of a function step 9. Function step 9 forms a speed-dependent function which, at speed v=0 has a value of 1, this value then decreasing with increasing speed up to a speed such as 5 to 10 km/h, down to a value of 0. This reduction may occur linearly or according to an arbitrarily specifiable function. Thus, the multiplication factor $f_v$ has the value f at a speed v=0, and reaches a value of 0 at the selected limiting speed of 5 to 10 km/h.

In an adding step 14, the magnified difference torque $m_{fh}$ thus formed is added to the driver-selected torque $m_F$ so that a magnified driver-selected torque $m_{fv}$ is formed. This is passed on to a switch-over-step 15, as an alternative definition of a resulting selected torque $m_{res}$, together with driver-selected torque $m_F$. The switching of switch-over step is effected by a comparison step 16, in which the driver-selected torque $m_F$ is compared to the actual value of the torque $m_{ist}$. Only when the actual value of the torque $m_{ist}$ is less than the driver-selected torque $m_F$ does a switch-over to the magnified driver-selected torque $m_{fv}$ occur, i.e., only under this condition is this selected as the resulting selected torque $m_{res}$ for the formation of the actual engine torque as the setpoint value.

When the driver presses down accelerator pedal 10 in order to raise the engine torque for the driveaway of the vehicle, the driver-selected torque $m_F$ becomes abruptly greater than the actual value of the torque $m_{ist}$, so that switch-over step 15 goes over into the second switching position. The difference torque $m_d$ thus arising is multiplied by multiplication factor $f_v$, and difference torque $m_{fh}$ magnified thereby is added to the driver-selected torque for the formation of a magnified driver-selected torque $m_{fv}$. The resulting selected torque $m_{res}$, which corresponds to the magnified driver-selected torque $m_{fv}$, thus abruptly exceeds the driver-selected torque, so that the actual engine torque rises rapidly and, even in case of an accelerator pedal being operated at too low a level, during driveaway of the vehicle from a standing position, prevents the internal combustion engine from being stopped unintentionally (stalled), and it does this even with a clutch being possibly engaged too fast.

Now, when the vehicle starts to move, as a result of the increasing speed the speed-dependent multiplication factor $f_v$ decreases continuously, and so does the magnified driver-selected torque, along with it. This effect is further reinforced by difference torque $m_d$ decreasing increasingly as a result of the increase in the actual value of the torque $m_{ist}$, and thereby also contributing to the decrease of the magnified difference torque $m_{fh}$ or the magnified driver-selected torque, respectively. When the speed reaches the set limiting value, such as 5 to 10 km/h, multiplication factor $f_v$ becomes 0, with the result that the magnified driver-selected torque $m_{fv}$ is equivalent to driver-selected torque $m_F$. The same occurs when the difference torque $m_d$ goes down to 0. Switch-over step 15 now switches over again in both cases to the switching state originally indicated. Thus, the torque magnification takes effect only directly and reinforced during driveaway, and then decreases again very rapidly, so that even at relatively low speeds there is no longer any perceptible effect, which has meaning, for example, in the case of processes involved in parking and leaving a parking space, where large torque impacts are undesirable.

The individual steps of the switching arrangement illustrated as an example embodiment may be actualized by a microcomputer, and may be present, for example, as additional functions in a microcomputer of central engine electronics that is present in any case, but of course, a separate microcomputer may be provided.

What is claimed is:

1. A method for magnifying torque during driveaway of a motor vehicle using a clutch, comprising the steps of:

dynamically magnifying driver-selected torque in time; and reducing an enhancement component to zero at increasing vehicle speed as a function of the vehicle speed.

2. The method according to claim 1, wherein the enhancement component is reduced to zero in the reducing step at a travel speed of 5 to 10 km/h.

3. The method according to claim 1, wherein the enhancement component is reduced to zero in the reducing step as an actual value of torque approaches the driver-selected torque.

4. The method according to claim 3, wherein the enhancement component is reduced in the reducing step as a function of a difference between the actual value of torque and the driver-selected torque.

5. The method according to claim 1, further comprising the step of forming the enhancement component in accordance with a speed-dependent multiplication factor.

6. The method according to claim 5, further comprising the step of reducing as a function of increasing speed a multiplier having a value of 1 at a speed of zero down to a value of zero at a definable speed value, the enhancement component formed in the forming step in accordance with the multiplier linked with a definable value.

7. The method according to claim 5, further comprising the steps of:

applying the multiplication factor to a difference between an actual value of torque and the driver-selected torque; and supplying a value obtained in the applying step to the driver-selected torque to achieve a magnified torque value.

8. The method according to claim 1, wherein the magnifying step is limited to a time interval during which an actual engine torque is less than the driver-selected torque.

9. The method according to claim 1, wherein the method is performed by a microcomputer.

* * * * *